June 10, 1930.    W. F. H. BRAUN    1,763,215
LAWN MOWER
Filed May 29, 1928    3 Sheets-Sheet 3

WITNESS:
Robt R Mitchel

INVENTOR
William F. H. Braun
BY
Augustus B. Stoughton
ATTORNEY.

Patented June 10, 1930

1,763,215

UNITED STATES PATENT OFFICE

WILLIAM F. H. BRAUN, OF WYNNEWOOD, PENNSYLVANIA

LAWN MOWER

Application filed May 29, 1928. Serial No. 281,444.

The present invention relates to power propelled and power actuated pedestrian steered lawn mowers.

The principal objects of the present invention are to provide a machine of the type recited in which the construction is such that the various parts and accessories are efficiently arranged, adequately housed and adapted for efficient cooperation in performing their duty; to provide a lawn mower of the type recited which shall be reliable, durable, efficient and easily controlled and governed; and to incorporate the ignition system and other accessories of the internal combustion engines into the structure of the machine in such a way that they will be housed and adequately supported.

Other objects of the invention will appear from the following description.

To these and other ends hereinafter stated or appearing, the invention comprises the improvements to be presently described and finally claimed.

In the following description reference will be made to the accompanying drawings forming part hereof and in which Figure 1 is a top or plan view illustrating a lawn mower emboding features of the invention.

Figure 1:
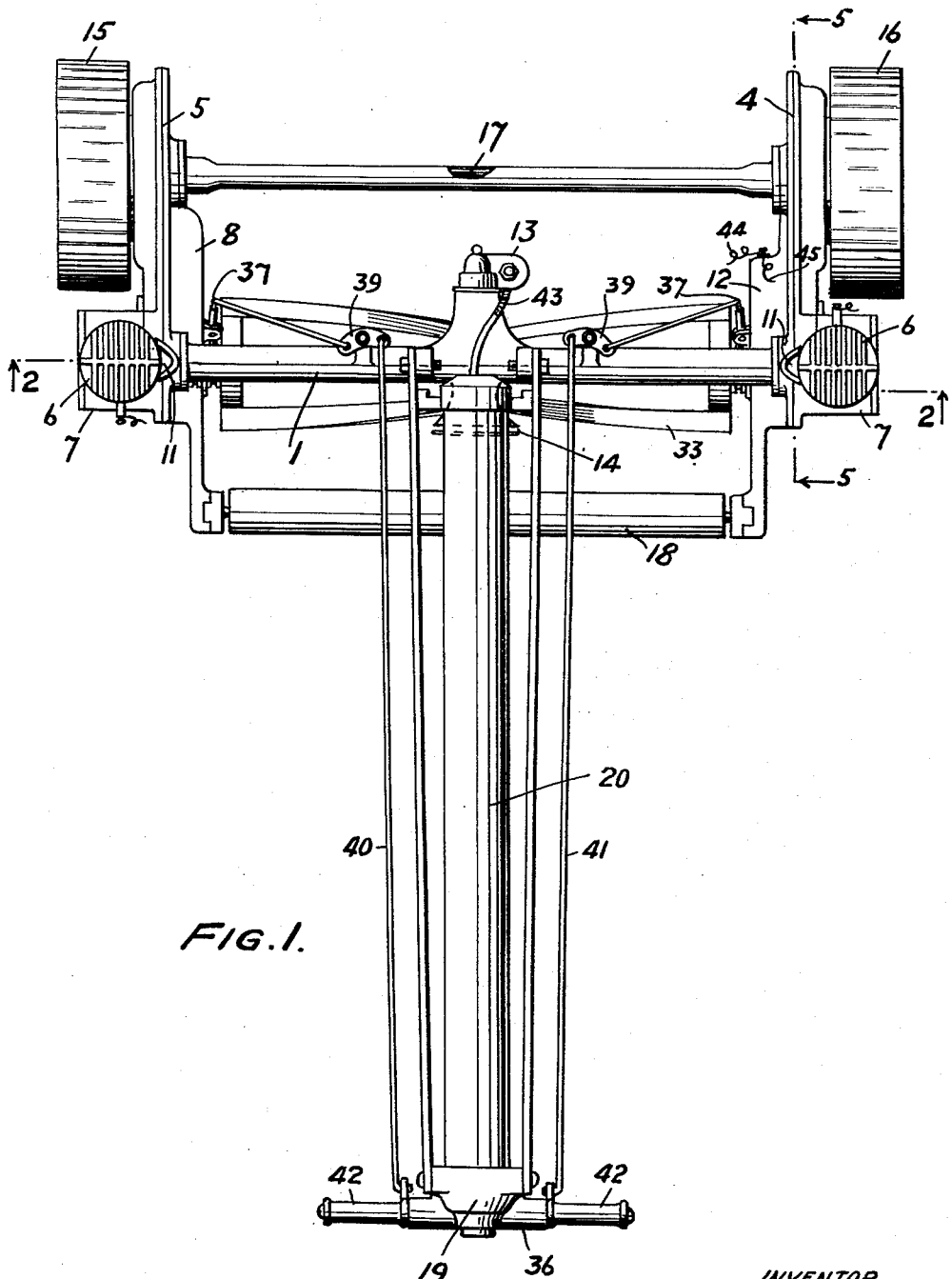
Figure 2:
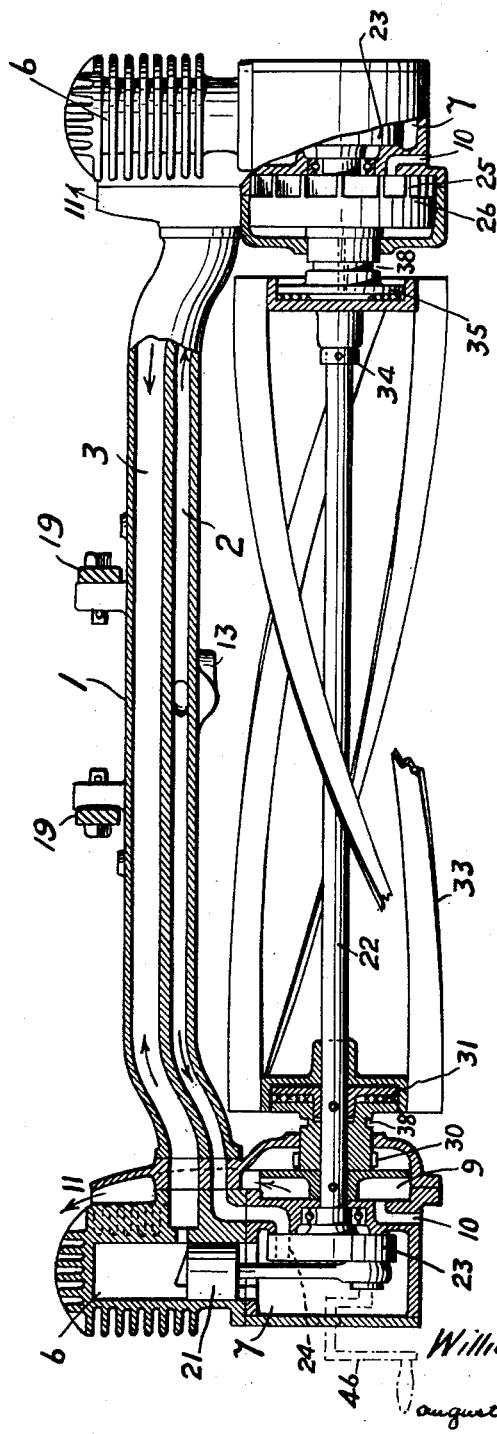
Fig. 2 is a view drawn to an enlarged scale partly in elevation and partly in section generally on the line 2—2 of Fig. 1.
Figure 3:
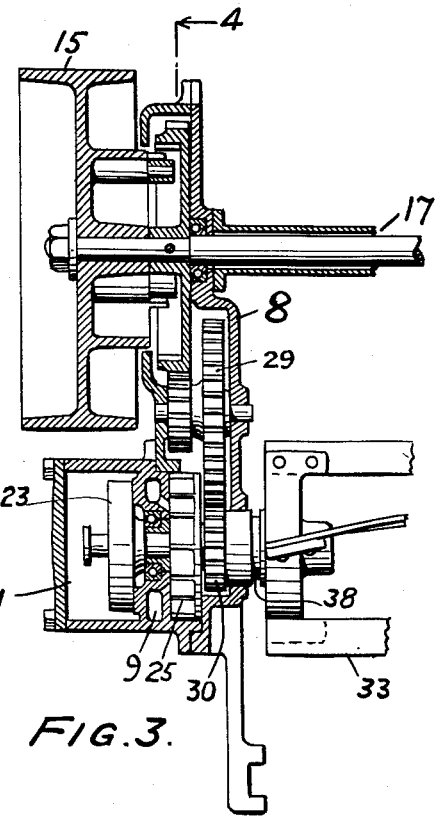
Fig. 3 is a horizontal sectional view through one end of the mower.
Figure 4:
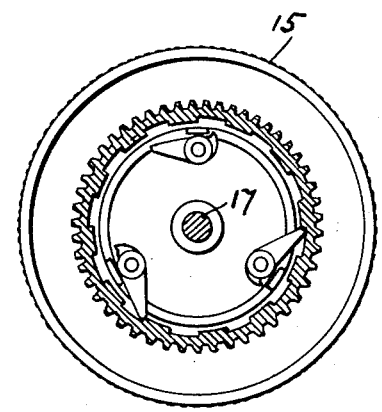
Fig. 4 is a sectional view taken on the line 4 of Fig. 3.
Figure 5:
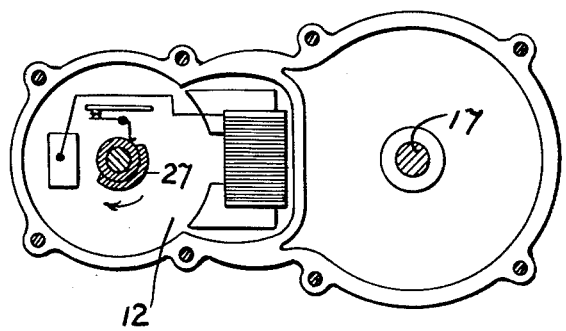
Fig. 5 is a sectional view taken on the line 5—5 of Fig. 1 and drawn to an enlarged scale.

There is a generally H-shaped frame of which the cross member 1, Fig. 2, includes admission and exhaust passages 2 and 3, and of which each parallel member 4 and 5 includes a cylinder 6 and a crank case 7, and a blower chamber 9, Fig. 2, having an air inlet 10 and an air outlet 11 conforming in general to a portion of the cylinder 6. The parallel member 4 in addition to the features of construction referred to also includes a magneto receptacle 12, Fig. 5 and the parallel member 5 includes a gear housing 8, Fig. 3. 13, Fig. 1, is a carbureter for the admission passage 2, and the exhaust passage is indicated at 14, Fig. 1. There are carrying wheels 15 and 16 and what may be called an axle element 17 which is driven and with which the wheels have the usual pawl and ratchet connection, Fig. 4. The carrying wheels are arranged forward and on the outside of the parallel members and between the parallel members toward the rear there is arranged a ground roller 18. The steering handle 19 includes the tank 20 for fluid fuel. 21 indicates pistons. 22 is a driving shaft arranged for rotation in the parallel members and disposed generally in line with and beneath the cross member. The pistons are connected by pitman rods with crank disks 23 arranged in the crank cases and provided with ports 24.

Figures 6, 7:
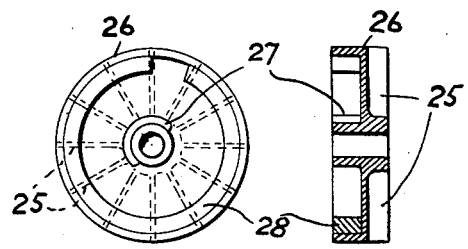
Fig. 6 is a detached view.
Fig. 7 is a sectional view of Fig. 6.

There are fly wheel fans arranged in the blower chambers but since they differ they will be described separately, however, it may be said that each is fast on the driving shaft 22 and includes vanes 25. The fan 26, Figs. 2, 6 and 7, projects into the magneto receptacle or it may be more accurate to say that the fan is in effect a fly wheel and the concavity in the face of the fly wheel opposite the face which carries the vanes is arranged in the left hand portion, Fig. 5, of the magneto receptacle. This portion of the fly wheel or fan structure 26 is provided with the rotor elements 27 and 28 of the magneto, the other elements of the latter being mounted on the wall of the magneto receptacle. There is gearing indicated at 29 arranged in the gear case 8 and interposed between the driving shaft 22 and the carrying wheels. The driver 30 of this gearing is loose on the shaft 22, Fig. 2. There is a clutch 31 between the driver 30 and the shaft 22. 33 is a cutter loose for rotation on the shaft 22 but held against endwise motion as by the collar 34. 35 is a clutch for the cutter. There are two sets of clutch operating mechanisms each operated from the cross bar 36 of the handle. Each mechanism as shown comprises a shipping fork 37, Fig. 1, operating in grooves 38, Fig. 2, in the movable clutch members, and also bell cranks 39, links 40 and 41 and crank handles 42 turnable by the operator.

It may be stated that the cutting bar usually provided is not shown in the drawings for sake of clearness.

43 is a connection from the fuel tank to the carbureter and there are connections from the magneto to the spark plugs of the engine, but they are too well understood to require special illustration or description. However, parts of them are indicated at 44 and 45, Fig. 1.

Assuming that the engines have been started as by means of a hand crank indicated in dotted lines at 46, Fig. 2, and that the engines are running with both clutches out of engagement, the mixture is supplied by way of 2 to the crank cases 7, its admission being governed by the ports 24, and the exhaust passes by way of the passage 3 and out at 14. To revolve the cutter the appropriate handle 42, the one to the right in Fig. 1, is turned in such a way that the clutch at the right in Fig. 2 is engaged. To start the machine forward, the handle 42 at the left in Fig. 1 is turned so that the clutch at the left in Fig. 2 is engaged. The vanes on the fly wheels or fans create currents of air which cool the cylinders, and the magneto parts on the fly wheel 26 in cooperation with the other magneto parts furnish ignition for the engines.

It will be obvious to those skilled in the art that modifications may be made in details of construction and arrangement, and matters of mere form, without departing from the spirit of the invention.

I claim:

1. A lawn mower including an H-shaped frame of which the cross member is hollow and provides admission and exhaust passages and of which each parallel member includes a cylinder and a crank case and a blower chamber and of which one parallel member also includes a magneto receptacle and of which the other parallel member also includes a gear housing.

2. A lawn mower including an H-shaped frame of which the cross member is hollow and provides admission and exhaust passages and of which each parallel member includes a cylinder and a crank case and a blower chamber and of which one parallel member also includes a magneto receptacle, and of which the other parallel member also includes a gear housing, a carbureter for the inlet passage, carrying wheels and a ground roller and a steering handle comprising a tank for said frame, pistons and a driving shaft and ported crank disks and fly wheel fans fast to said shaft and arranged in the blower chambers and of which one fly wheel is provided with magneto rotor elements, gearing from said shaft to the carrying wheels and of which the driver is loose on the shaft, a clutch between said driver and shaft, a cutter loose for rotation on the shaft, a clutch for said cutter, and two sets of clutch operating mechanisms each operative from the cross bar with which the handle is provided.

3. In a lawn mover having an internal combustion engine and its accessories including a driving shaft and a frame in which the shaft is journaled, a cutter revolubly mounted on said driving shaft, a confronting magneto receptacle and blower chamber provided within the frame, and a fly wheel mounted on said shaft and provided on one face with vanes arranged in the blower chamber and on the other face with magneto rotor elements arranged in the magneto receptacle, said magneto receptacle provided with the other magneto elements.

4. In a lawn mower having a plurality of internal combustion cylinders and a driving shaft, a plurality of pistons cooperating with said cylinders and said driving shaft, a magneto continuously operated by said shaft, a cutter revolubly mounted on said shaft, ground wheels, gearing for driving the ground wheels from said shaft and of which the driver is loose on said shaft, and clutch mechanisms whereof one appertains to the cutter and the other to the driver.

5. A lawn mower having an internal combustion engine and its accessories including a driving shaft and a frame in which the shaft is journaled, a cutter revolubly mounted on said driving shaft, a gear housing and a blower chamber provided within the frame, a fly wheel mounted on said shaft and having vanes arranged in the blower chamber, gearing arranged in said housing, and a clutch interposed between the gearing and the shaft.

WILLIAM F. H. BRAUN.